US005122402A

United States Patent [19]

Gemert

[11] Patent Number: 5,122,402

[45] Date of Patent: Jun. 16, 1992

[54] ELECTRICAL OR OPTICAL CABLE MANUFACTURE

[75] Inventor: Rudolf Gemert, Brockville, Canada

[73] Assignee: Phillips Cables Ltd., Canada

[21] Appl. No.: 641,287

[22] Filed: Jan. 15, 1991

[30] Foreign Application Priority Data

Jan. 16, 1990 [GB] United Kingdom ................ 9000891

[51] Int. Cl.[5] ......................... B65D 69/00; F16L 9/00

[52] U.S. Cl. .................................. 428/36.9; 206/231; 138/170

[58] Field of Search .......................... 156/53; 206/231; 428/36.9; 138/170

[56] References Cited

U.S. PATENT DOCUMENTS 5,018,268 5/1991 Chabane et al. ...................... 156/53

*Primary Examiner*—James J. Seidleck

*Attorney, Agent, or Firm*—Anthony J. Casella; Gerald E. Hespos

[57] ABSTRACT

A kit of parts for assembling an elongate former suitable for transversely folding a longitudinally advancing tape around an advancing cable core comprises a primary former having a conically-shaped channel therethrough, a plurality of separately formed nose cones each having a conically-shaped bore, the cross-sectional size of the bore of each nose cone at its downstream end differing from that of each of the other nose cones, and means for detachably securing any nose cone to the downstream end of the primary former. Each nose cone has a length substantially less than the primary former and, as a consequence, each nose cone is readily formed from a transversely folded strip of sheet metal.

10 Claims, 1 Drawing Sheet

ELECTRICAL OR OPTICAL CABLE MANUFACTURE

Figure 1:
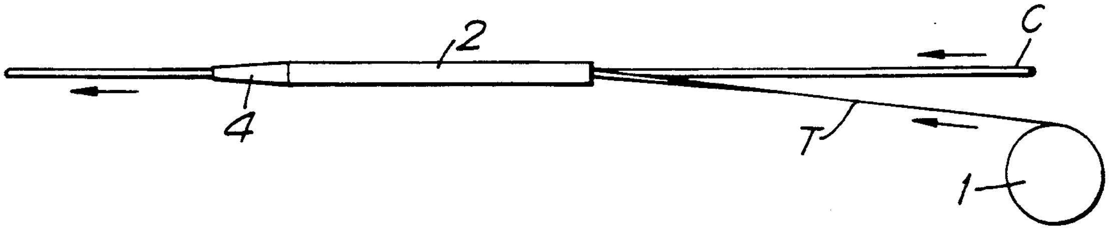

In the manufacture of an electric or optical cable, it is common practice to enclose a core or an assembly of cores of the cable travelling in the direction of its length within a covering constituted by a tape which is applied longitudinally to and is folded transversely around the advancing core or assembly of cores. Depending on the circumstances, the tape may be of electrically insulating material, of metal or metal alloy or of a composite form comprising at least one layer of electrically insulating material and at least one layer of metal or metal alloy bonded together.

In one known method of enclosing an advancing core or assembly of cores of an electric or optical cable within a covering by the aforesaid method, the core or assembly of cores and the tape are caused to pass through an elongate former which has a bore or channel decreasing smoothly and gradually in cross-sectional size between the upstream and downstream ends of the elongate former and which serves to fold the advancing tape transversely around the core or assembly of cores as it travels through the former. Cable cores or assemblies of cable cores that are to be enclosed within a covering of this known kind have a wide range of diameters differing from one another and, as a consequence, a cable manufacturer has to have available a large number of elongate formers having bores or channels which at their downstream ends are of sizes differing from one another in order that the manufacturer can accommodate a cable core or assembly of cable cores of any diameter to which a longitudinally extending transversely folded tape is to be applied. Each such elongate former, which can be of a length of at least one meter, is relatively expensive to manufacture. Furthermore, replacing one elongate former by another elongate former having a bore or channel of a different size at its downstream end is a tedious, time consuming and expensive exercise.

It is an object of the present invention to provide a kit of parts for assembling an elongate former suitable for transversely folding a longitudinally advancing tape around a cable core or an assembly of cable cores travelling through the former in the direction of its length, which kit of parts enables any one of a plurality of elongate formers having open-ended passages of sizes at their downstream ends differing from one another to be readily assembled.

According to the invention, the kit of parts comprises a primary elongate former which has an open-ended passage decreasing smoothly and gradually in cross-sectional size between the upstream and downstream ends of the primary former; a plurality of supplementary elongate formers (hereinafter referred to as nose cones) each separately formed with respect to the primary elongate former and each having an open-ended passage decreasing smoothly and gradually in cross-sectional size between the upstream and downstream ends of the nose cone, the cross-sectional size of the passage of each nose cone at its downstream end differing from the cross-sectional size of the passage of each of the other nose cones at said end of the nose cone; and means for detachably securing any one of said nose cones to the downstream end of the primary elongate former in such a way that the elongate former and said nose cone are in substantially axial alignment and there is no step or other protrusion within the aligned passages of the primary elongate former and said nose cone which will inhibit travel therethrough of a cable core or assembly of cable cores and of a longitudinally extending tape being transversely folded around the advancing cable core or assembly of cable cores.

In use, the primary elongate former will be substantially permanently disposed in a cable manufacturing line and any one of said nose cones will be detachably secured to the downstream end of the primary elongate former as appropriate for the particular cable core or assembly of cable cores to which a covering in the form of a longitudinally extending, transversely folded tape is to be applied. As will be appreciated, the primary elongate former will accommodate any cable core or assembly of cable cores having a diameter lying within a wide range of diameters differing from one another and any one of said plurality of separately formed nose cones will be selected from the kit having at the downstream end of its passage a cross-sectional size appropriate to the diameter of the cable core or assembly of cable cores to be covered.

The open-ended passage of the primary elongate former and of each of the nose cones may be a bore bounded by a substantially peripherally continuous wall or it may be a channel. In a preferred kit of parts, the passage of the primary elongate former is a channel and the passage of each nose cone is a bore.

Preferably, each separately formed nose cone has an axial length which is substantially less than the axial length of the primary elongate former. For example, where the primary elongate former has a length of L, each separately formed nose cone may have a length lying in the range 0.05 to 0.15 L.

By virtue of the fact that each separately formed nose cone preferably has a length substantially less than the length of the primary elongate former, each nose cone can be readily formed from a transversely folded sheet of metal or metal alloy, eg stainless steel, to form a nose cone of tubular form, the bore of the tubular nose cone being of substantially circular cross-section throughout its length.

In a preferred embodiment, however, the strip of sheet metal or metal alloy is so transversely folded that marginal portions of the strip lying alongside its longitudinally extending edges overlap and are so secured together that said overlapping marginal portions are spaced apart in a radial direction and form, throughout the length of the nose cone, a supplementary passage for one longitudinally extending marginal portion of a transversely folded tape passing therethrough. For example, the outer of said marginal portions of said strip of sheet metal or metal alloy near its longitudinally extending free edge may be folded in opposite senses along two circumferentially spaced longitudinally extending lines to form a flanged radially extending wall which is spot welded or otherwise permanently secured to the underlying par of the strip. By this arrangement, adhesive or a preformed adhesive strip carried on a surface of one of two overlapping longitudinally extending marginal portions of a transversely folded tape passing through the nose cone will not come into contact with the other of said marginal portions of the tape, thereby to secure said overlapping marginal portions of the tape together, until the transversely folded tape emerges from the downstream end of the nose cone.

Any convenient method of detachably securing to the downstream end of the primary elongate former any one of said plurality of nose cones of the kit may be employed. For example, the primary elongate former may have a substantially rigid bar welded or otherwise permanently secured to the former, which bar protrudes lengthwise beyond the downstream end of the former effectively to form a tongue, and each of the nose cones may have welded or otherwise permanently secured to the nose cone near its upstream end a pair of circumferentially spaced, longitudinally extending substantially rigid bars effectively forming a clevis into which the "tongue" of the primary elongate former can engage and be detachably secured.

The invention also includes a nose cone for detachably securing to the downstream end of a primary elongated former which has an open-ended passage decreasing smoothly and gradually in cross-sectional size between its upstream and downstream ends and which is suitable for transversely folding a longitudinally advancing tape around at least one cable core travelling through the former in the direction of its length, which nose cone comprises a strip of sheet metal or metal alloy so transversely folded that marginal portions of the strip lying alongside its longitudinally extending edges overlap and are so secured together that said overlapping marginal portions are spaced apart in a radial direction and form, throughout the length of the nose cone, a supplementary passage for one longitudinally extending marginal portion of a transversely folded tape passing therethrough.

Figure 2:
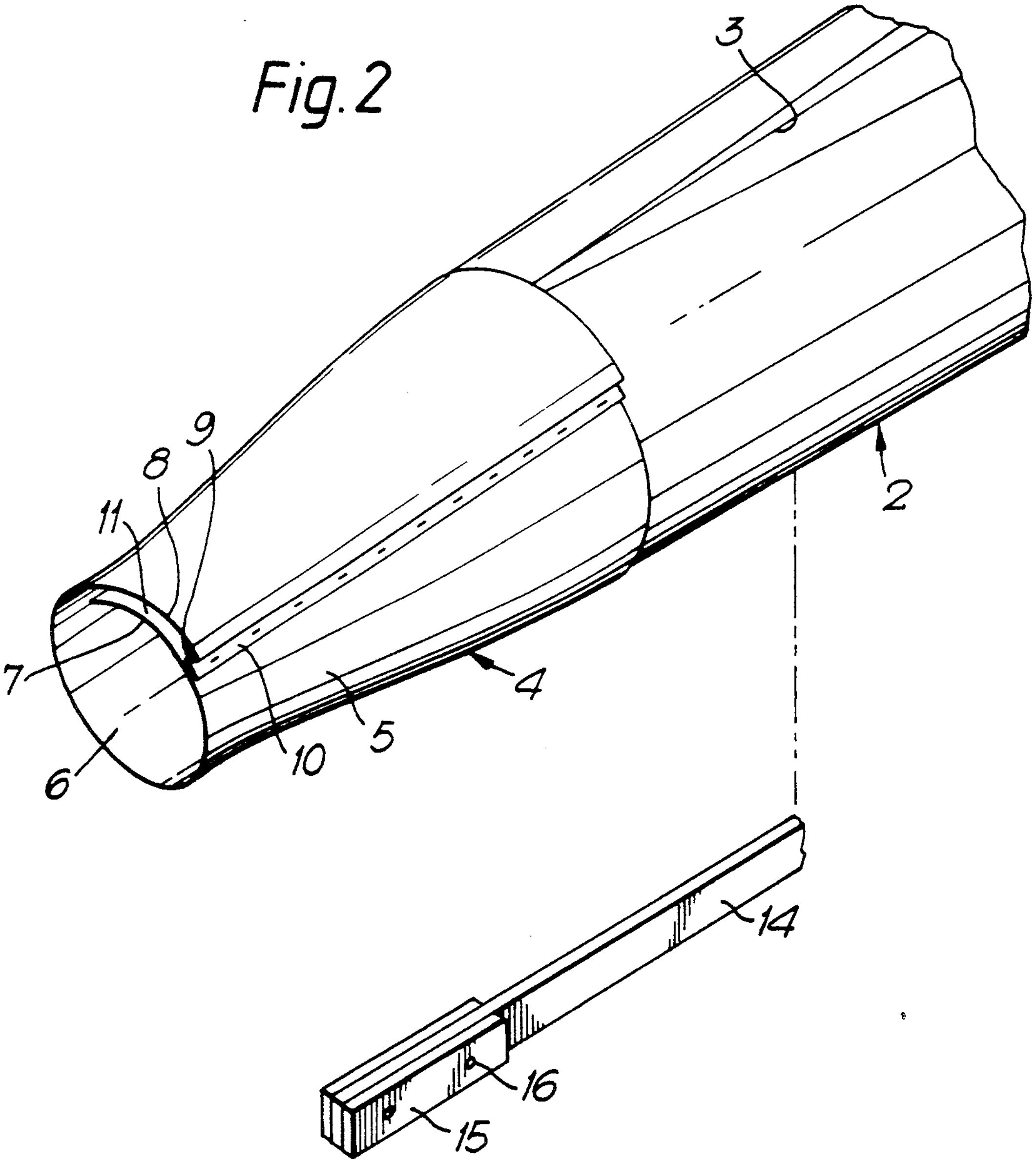

The invention is further illustrated by a description, by way of example, of an elongate former assembled from a preferred kit of parts with reference to the accompanying drawings, in which:

FIG. 1 is a fragmental, diagrammatic side view of apparatus employed in the manufacture of an electric cable core, and FIG. 2 is an exploded fragmental, diagrammatic perspective view of the components of the elongate former assembled from the preferred kit of parts.

Referring to the drawings, a core C of an electric cable and a tape T from a source of supply 1 advancing in the directions of their lengths are drawn through an elongate former which serves to fold the advancing tape transversely around the advancing core and which comprises a primary elongate former 2 and a separately formed nose cone 4 detachably secured to the downstream end of the primary elongate former.

The primary elongate former 2 and the nose cone 4 constitute components of a kit of parts for assembling elongate formers, which kit of parts comprises the primary elongate former 2 which has an open-ended channel 3 decreasing smoothly and gradually in cross-sectional size between the upstream and downstream ends of the primary former and a plurality of nose cones 4 each separately formed with respect to the primary elongate former and each having an open-ended bore 6 decreasing smoothly and gradually in cross-sectional size between the upstream and downstream ends of the nose cone, the cross-sectional size of the bore of each nose cone at its downstream end differing from the cross-sectional size of the bore of each of the other nose cones at said end of the nose cone. Each nose cone 4, of which one is illustrated in FIG. 2, is of an axial length approximating to 0.15 of the axial length of the primary elongate former 2 and comprises a strip 5 of sheet stainless steel so transversely folded that marginal portions 7, 8 of the strip lying alongside its longitudinally extending edges overlap and are so secured together that these overlapping marginal portions are spaced apart in a radial direction and form, throughout the length of the nose cone, a supplementary passage 11 for one longitudinally extending marginal portion of the transversely folded tape T passing therethrough. To this end, the outer marginal portion 8 of the strip 5 near its longitudinally extending free edge is folded in opposite senses along two circumferentially spaced longitudinally extending lines to form a radially extending wall 9 having a longitudinally extending flange 10 which is spot welded at longitudinally spaced positions to the underlying part of the strip. By this arrangement, adhesive carried on a surface of one of the two overlapping longitudinally extending marginal portions of the transversely folded tape T passing through the nose cone 4 does not come into contact with the other of these marginal portions of the tape, thereby to secure the overlapping marginal portions of the tape together, until the transversely folded tape emerges from the downstream end of the nose cone.

To effect detachable securing of a nose cone 4 to the downstream end of the primary elongate former 2, the primary elongate former has a rigid bar 14 welded to the underside of the former, which bar protrudes lengthwise beyond the downstream end of the former effectively to form a tongue, and each of the nose cones 4 of the kit of parts has welded to the underside of the nose cone near its upstream end a pair of circumferentially spaced, longitudinally extending rigid bars 15 (for clarity, the exploded view in FIG. 2 showing the bar spaced from the former) effectively forming a clevis into which the "tongue" 14 of the primary elongate former can engage and be detachably secured by bolts 16.

The primary elongate former 2 will be substantially permanently disposed in a cable manufacturing line and will accommodate any cable core or assembly of cable cores having a diameter lying within a wide range of diameters differing from one another and any one of the plurality of separately formed nose cones 4 of the kit of parts having at the downstream end of its bore a cross-sectional size appropriate to the diameter of the cable core or assembly of cable cores to which a covering in the form of a longitudinally extending transversely folded tape T is to be applied, can be selected from the kit and detachably secured to the downstream end of the primary elongate former.

What I claim as my invention is:

1. A kit of parts for assembling an elongate former suitable for transversely folding a longitudinally advancing tape around at least one cable core travelling through the former in the direction of its length, which kit of parts comprises a primary elongate former which has an open-ended passage decreasing smoothly and gradually in cross-sectional size between the upstream and downstream ends of the primary former; a plurality of nose cones each separately formed with respect to the primary elongate former and each having an open-ended passage decreasing smoothly and gradually in cross-sectional size between the upstream and downstream ends of the nose cone, the cross-sectional size of the passage of each nose cone at its downstream end differing from the cross-sectional size of the passage of each of the other nose cones at said end of the nose cone; and means for detachably securing any one of said nose cones to the downstream end of the primary elongate former in such a way that the elongate former and said nose cone are in substantially axial alignment and there is no protrusion within the aligned passages of the primary elongate former and said nose cone which will inhibit travel therethrough of at least one advancing cable core and of a longitudinally extending tape being transversely folded around said at least one cable core.

2. A kit of parts as claimed in claim 1, wherein the open-ended passage of the primary elongate former and of each of the nose cones is a bore bounded by a substantially peripherally continuous wall.

3. A kit of parts as claimed in claim 1, wherein the open-ended passage of the primary elongate former is a channel and the open-ended passage of each of the nose cones is a bore bounded by a substantially peripherally continuous wall.

4. A kit of parts as claimed in claim 1, wherein each separately formed nose cone has an axial length which is substantially less than the axial length of the primary elongate former.

5. A kit of parts as claimed in claim 4, wherein the primary elongate former has a length of L and each separately formed nose cone has a length lying in the range 0.05 to 0.15 L.

6. A kit of parts as claimed in claim 4, wherein each nose cone comprises a sheet of metal or metal alloy transversely folded to form a nose cone of tubular form, the bore of the tubular nose cone being of substantially circular cross-section throughout its length.

7. A kit of parts as claimed in claim 6, wherein the strip of sheet metal or metal alloy of each nose cone is so transversely folded that marginal portions of the strip lying alongside its longitudinally extending edges overlap and are so secured together that said overlapping marginal portions are spaced apart in a radial direction and form, throughout the length of the nose cone, a supplementary passage for one longitudinally extending marginal portion of a transversely folded tape passing therethrough.

8. A kit of parts as claimed in claim 7, wherein the outer of said marginal portions of the strip of sheet metal or metal alloy of each nose cone near its longitudinally extending free edge is folded in opposite senses along two circumferentially spaced longitudinally extending lines to form a flanged radially extending wall which is permanently secured to the underlying part of the strip.

9. A kit of parts as claimed in claim 1, wherein the means for detachably securing any one of said nose cones to the downstream end of the primary elongate former comprises a substantially rigid bar permanently secured to the primary elongate former, which bar protrudes lengthwise beyond the downstream end of the former effectively to form a tongue and, permanently secured to each nose cone near its upstream end, a pair of circumferentially spaced, longitudinally extending substantially rigid bars effectively forming a clevis into which the "tongue" of the primary elongate former can engage and be detachably secured.

10. A nose cone for detachable securing to the downstream end of a primary elongate former which has an open ended passage decreasing smoothly and gradually in cross-sectional size between its upstream and downstream ends and which is suitable for transversely folding a longitudinally advancing tape around at least one cable core travelling through the former in the direction of its length, which nose cone comprises a strip of sheet metal or metal alloy so transversely folded that marginal portions of the strip lying alongside its longitudinally extending edges overlap and are so secured together that said overlapping marginal portions are spaced apart in a radial direction and form, throughout the length of the nose cone, a supplementary passage for one longitudinally extending marginal portion of a transversely folded tape passing therethrough.

* * * * *